United States Patent [19]

Tang

[11] Patent Number: 5,344,614
[45] Date of Patent: Sep. 6, 1994

[54] REACTOR FOR REDUCING SULFUR OXIDES EMISSIONS IN A COMBUSTION PROCESS

[75] Inventor: John T. Tang, Easton, Pa.

[73] Assignee: Foster Wheeler Energy Corporation, Clinton, N.J.

[21] Appl. No.: 943,650

[22] Filed: Sep. 11, 1992

[51] Int. Cl.⁵ .................. B01D 50/00; F01N 3/08
[52] U.S. Cl. ...................... 422/170; 261/17; 261/109; 261/118; 422/176
[58] Field of Search .......... 422/170, 176; 261/17, 261/109, 118, DIG. 9; 55/DIG. 30

[56] References Cited

U.S. PATENT DOCUMENTS

| | | |
|---|---|---|
| 3,320,906 | 5/1967 | Domahidy . |
| 3,582,050 | 6/1971 | Kozak ................... 261/118 |
| 3,862,295 | 1/1975 | Tolles . |
| 3,880,597 | 4/1975 | Goldschmidt et al. ........... 422/176 |
| 4,135,885 | 1/1979 | Wormser et al. ................. 422/176 |
| 4,213,766 | 7/1980 | Wyatt ................... 422/176 |
| 4,276,063 | 6/1981 | Lackey et al. ........... 261/17 |
| 4,344,920 | 8/1982 | Isserlis . |
| 4,525,142 | 6/1985 | Gleason et al. . |
| 4,559,211 | 12/1985 | Feldman et al. . |
| 4,587,113 | 5/1986 | Joubert . |
| 4,604,269 | 8/1986 | Yoon . |
| 4,613,487 | 9/1986 | Yoon et al. . |
| 4,615,871 | 10/1986 | Yoon . |
| 4,645,652 | 2/1987 | Kimura . |
| 4,663,136 | 5/1987 | Furlong . |
| 4,690,697 | 9/1987 | Schwartz et al. . |
| 4,724,130 | 2/1988 | Statnick et al. . |
| 4,788,047 | 11/1988 | Hamala et al. . |
| 4,854,129 | 8/1989 | Hickley et al. ................... 261/118 |
| 4,867,949 | 9/1989 | Betz ................... 422/176 |
| 4,867,955 | 9/1989 | Johnson . |
| 4,915,920 | 4/1990 | Kobayashi . |
| 4,952,247 | 8/1990 | Schrader et al. ................... 422/170 |
| 4,978,368 | 12/1990 | Richard ................... 261/118 |
| 5,002,743 | 3/1991 | Kokkonen et al. . |
| 5,043,146 | 8/1991 | Ishikawa et al. ................... 422/176 |

*Primary Examiner*—Timothy M. McMahon
*Attorney, Agent, or Firm*—Marvin A. Naigur

[57] ABSTRACT

A reactor for reducing sulfur oxides emissions in a combustion process in which flue gases containing entrained fuel and sorbent particles are humidified so that the sulfur oxides are absorbed on the sorbent particles to reduce the discharge of the sulfur oxides into the environment.

3 Claims, 3 Drawing Sheets

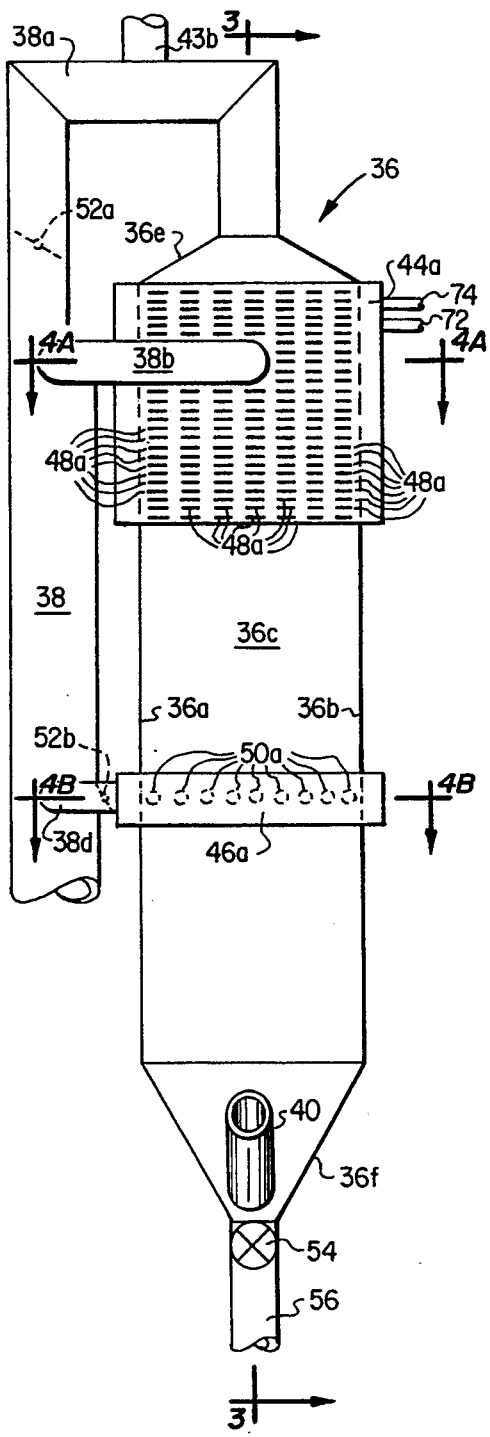
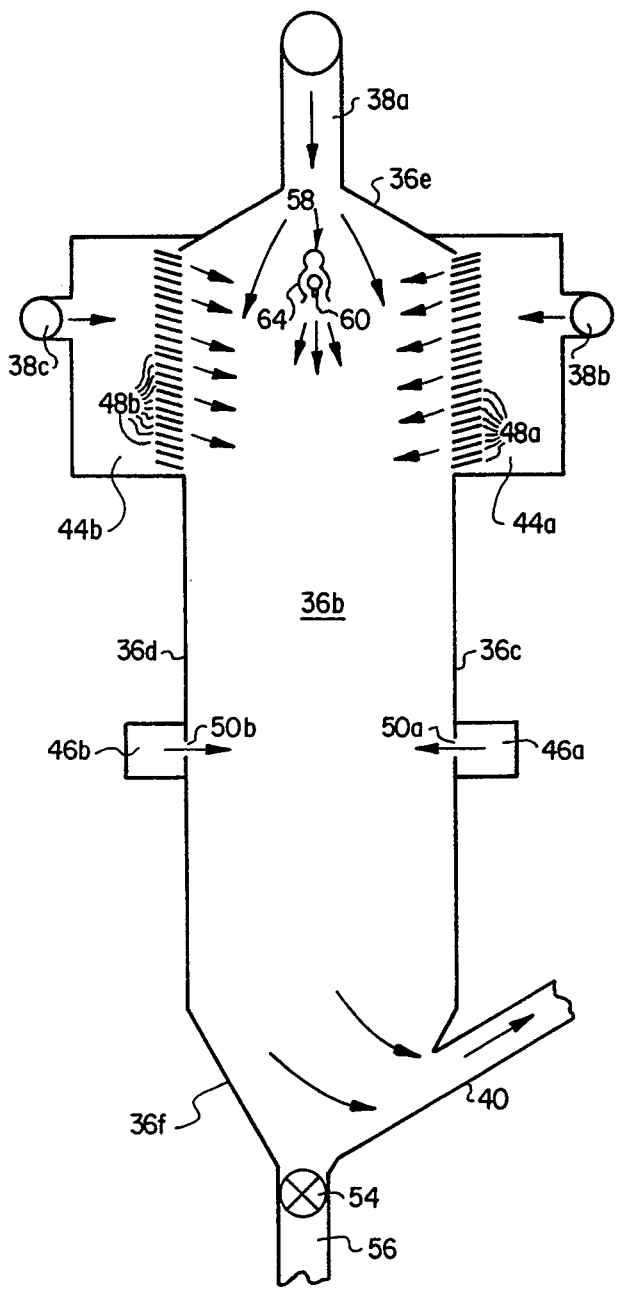
FIG. 2
FIG. 3

000
REACTOR FOR REDUCING SULFUR OXIDES EMISSIONS IN A COMBUSTION PROCESS

BACKGROUND OF THE INVENTION

This invention relates to the combustion of sulfur-containing fuels, and, more particularly, to a reactor for reducing sulfur oxides emissions in gaseous products resulting from the combustion of sulfur containing fuels.

Substantial efforts have been made to reduce sulfur oxides emissions in gaseous products resulting from the combustion of sulfur containing fuels in reactors to comply with environmental regulations. For example, in the operation of fluidized bed reactors, limestone is often added to the fluidized bed medium, which includes crushed coal, for absorbing the sulfur oxides generated as a result of combustion of the coal. This reactor, however, results in excessive limestone consumption when reducing emissions of sulfur oxides beyond 90 percent.

The excessive consumption of limestone results in several undesirable effects. For example, the requirement to reduce sulfur oxides emission beyond 90 percent necessitates a Ca/S mole ratio of 3.5 or higher which results in ash which is both hazardous and expensive for disposal. Further, the excessive consumption of limestone results in a significant increase in the emission of nitrogen oxides, as well as in a substantial reduction in reactor efficiency due to an increase in limestone calcination.

More recent advances in reducing the emission of sulfur oxides rely on a dry scrubbing process in which lime is slaked to form a slurry of calcium hydroxide. The calcium hydroxide slurry is introduced into a spray dryer through an atomizer which creates a plurality of slurry particles which react with the sulfur oxides to form calcium sulfate or calcium sulfite while the slurry droplets are simultaneously dried. Typically, the dried particles and fly ash are removed from the flue gas stream by a fabric baghouse filter.

However, this dry scrubbing process is generally considered too expensive for use in many industrial coal-fired fluidized bed reactors because it incurs a significant cost disadvantage by using lime instead of limestone since the cost of the lime is as much as ten times the cost of the limestone.

Accordingly, there remains a need in the art for a method for treating flue gases to remove fly ash and to remove sulfur oxides without incurring the additional cost of using lime.

SUMMARY OF THE INVENTION

It is therefore an object of the present invention to provide a reactor which reduces the emission of sulfur oxides in gaseous products resulting from the combustion of sulfur containing fuels.

It is still a further object of the present invention to provide a reactor of the above type in which a film of alkali solution is formed on the surface of a sulfur absorbing material for absorbing the sulfur oxides.

It is a still further object of the present invention to provide a reactor of the above type in which the fuel is combusted in a fluidized bed reactor containing said sulfur-absorbing material.

Toward the fulfillment of these and other objects, flue gases containing entrained fuel and sorbent particles humidified in a reactor to form a film of alkali solution on the absorbent material for absorbing the sulfur oxides and thus reducing the discharge of the sulfur oxides into the environment.

BRIEF DESCRIPTION OF THE DRAWINGS

The above brief description as well as further objects, features and advantages of the reactor of the present invention will be more fully appreciated by reference to the following detailed description of presently preferred but nonetheless illustrative embodiments in accordance with the present invention when taken in conjunction with the accompanying drawing in which:

FIG. 2 is a schematic side view depicting the humidifying reactor of the present invention; and FIG. 3 is a cross sectional view taken along line 3—3 of FIG. 2.

DESCRIPTION OF THE PREFERRED EMBODIMENT

Figure 1:
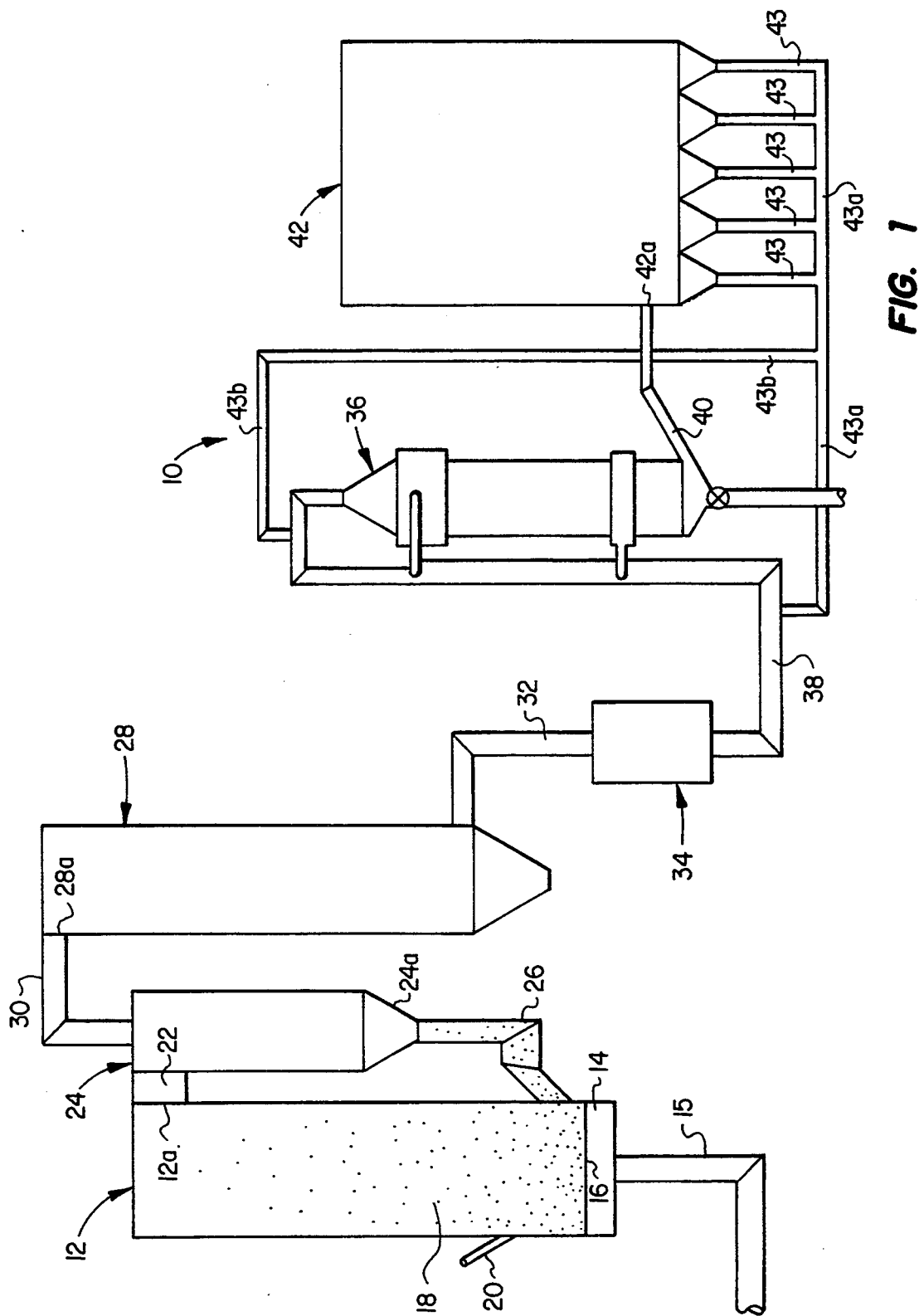
FIG. 1 is a schematic view depicting a fluidized bed reactor embodying principles of the present invention.

The reactor of the present invention will be described in connection with a natural water circulating steam generator shown in general by the reference numeral 10 in FIG. 1 of the drawings.

The steam generator 10 includes a fluidized bed reactor 12 having four walls each formed by a plurality of vertically-disposed tubes interconnected by vertically elongated bars or fins to form a substantially rectangular, contiguous and air-tight structure. Since this type of structure is conventional, it is not shown in the drawings nor will it be described in any further detail. A plenum chamber 14 is disposed at the lower portion of the reactor 12 into which pressurized air from a duct 15 is introduced by conventional means, such as a forced-draft blower, or the like (not shown).

A perforated air distribution plate 16 is suitably supported at the lower end of the combustion chamber of the reactor 12, and above the plenum chamber 14. The air introduced through the plenum chamber 14 passes in an upwardly direction through the air distribution plate 16 and may be preheated by air preheaters (not shown) and appropriately regulated by air control dampers as needed. The air distribution plate 16 is adapted to support a bed 18 of particulate material so that the air passing through the plate fluidizes the material. The material consists in general, of crushed coal and limestone, or dolomite, for absorbing a portion of the sulfur oxides (SOx) formed during the combustion of the coal.

A fuel distributor 20 extends through the front wall of the reactor 12 for introducing particulate fuel into the bed 18, it being understood that other distributors can be associated with the walls of the reactor 12 for distributing particulate sorbent material and/or additional particulate fuel material into the bed 18, as needed.

A conduit 22 registers with an opening 12a formed in the upper portion of the rear wall of the reactor 12 by bending back some of the tubes (not shown) forming the latter wall. The conduit 22 connects the reactor 12 with a cyclone separator 24 of conventional construction. Gases from the reactor 12, which consist largely of the gaseous products of combustion and some of the fluidizing air, thus enter the separator 24, and swirl around in an annular chamber defined in the separator 12 to separate a portion of the entrained relatively-fine particles therefrom by centrifugal forces, before the gases leave the separator 24. The separator 24 includes a hopper portion 24a into which the separated fine particles fall before being passed back into the reactor 12 by a recycle conduit 26.

A heat recovery enclosure 28 is formed adjacent the separator 24 and has an opening 28a formed in the upper wall portion which receives the relatively-clean flue gases from the separator via a conduit 30. The heat recovery enclosure 28 is of conventional construction for transferring of heat and therefore will not be described any further.

A gas flow duct 32 is provided at the base of the heat recovery enclosure 28 for connecting an air pre-heater 34 in gas flow communication with the enclosure 28. The pre-heater 34 operates to transfer heat from the gases received from the enclosure 28 to oxidizing gases and since it is of conventional construction, it will not be described further.

The humidifying reactor of the present invention is referred to, in general, by the reference numeral 36 and has an inlet connecting the air pre-heater 34 in gas flow communication, via a duct 38. The reactor 36 also has an outlet connecting a baghouse 42 in gas flow communication, via duct 40.

The baghouse 42 is disposed adjacent the reactor 36 and has an opening 42a formed in the lower wall portion which receives the relatively cool flue gases from the reactor. The baghouse 42 is of conventional design and contains, for example, fabric filters in the path of the flue gases as they pass through the baghouse. The baghouse 42 operates in a conventional fashion to remove entrained particulate material from the flue gases. An outlet duct (not shown) extends from the baghouse 42 for discharging the flue gases from the baghouse to an external stack, or the like.

A plurality of outlet ducts 43 are formed below the baghouse 42 for the discharge of filtered particulate material. A main duct 43a is formed at the base of the outlet ducts 43 and extends to a lower portion of the duct 38. A branch duct 43b registers with the main duct 43a and extends to the upper portion of duct 38 above the reactor 36 for purposes that will be described.

Referring to FIG. 2, the reactor 36 includes a front wall 36a, a spaced, parallel rear wall 36b, and two spaced, parallel side walls, 36c and 36d (FIG. 3), which extend perpendicular to the front and rear walls to form a substantially rectangular reactor. Further, the reactor 36 includes a roof 36e which is pyramidal in shape and has four triangular faces, and a base 36f having an inverted pyramidal shape, also having four triangular faces.

The walls 36a, 36b, 36c, 36d, the roof 36e and the base 36f of the reactor 36 are formed out of metal plates, known in the industry, to form a contiguous, air-tight structure. Since this type of structure is conventional, it will not be described in any further detail.

Figure 4A:
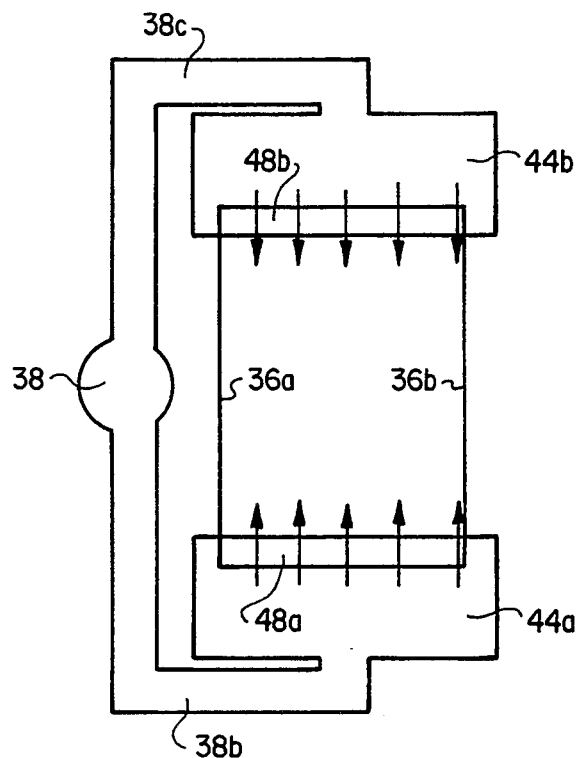
FIG. 4A is a cross-sectional view taken along line 4A—4A of FIG. 2.
Figure 4B:
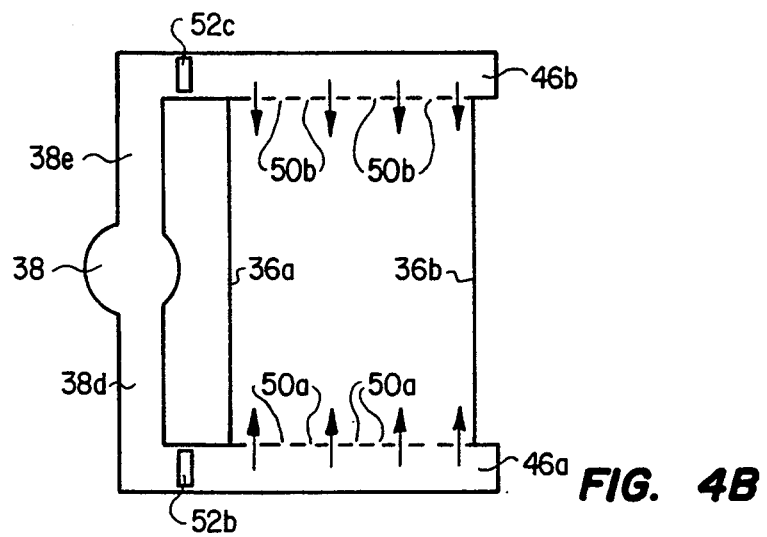
FIG. 4B is a cross-sectional view taken along line 4B—4B of FIG. 2.

As shown in FIGS. 2, 4A and 4B, the duct 38 is disposed in front of the reactor 36 and has five outlet branches 38a, 38b, 38c, 38d, and 38e for passing flue gas from the pre-heater 34 to the reactor 36. As better shown in FIGS. 2, 3 and 4A, the branch 38a registers with an opening in the roof 36e, and the branches 38b and 38c register with openings in two plenum chambers 44a and 44b, respectively, located on the upper portions of the side walls 36c and 36d, respectively. As better shown in FIG. 4B, the branches 38d and 38e register with openings in two plenum chambers 46a and 46b, respectively, located on the lower portion of the side walls 36c and 36d, respectively.

A plurality of louvers 48a and 48b (FIG. 3) are located in the upper portion of the side walls 36c and 36d, respectively, and permit the flue gases to flow from the plenum chambers 44a and 44b, respectively, into the reactor 36. Similarly, a plurality of openings 50a and 50b (FIG. 4B) are located in the lower portion of the side walls 36c and 36d, respectively, and permit the flue gases to flow from the plenum chambers 46a and 46b, respectively, to the reactor 36. Three dampers 52a (FIG. 2), 52b, and 52c (FIG. 4B) are disposed in the outlet branches 38a, 38d, and 38e, respectively, to control the flow of the flue gases. The flue gases exit the reactor 36 through the outlet duct 40 (FIG. 3) registering with an opening formed in the base 36f of the reactor 36 and the solid particulate material exits through a rotary valve 54 disposed in an outlet duct 56 at the bottom of the base 36f.

Referring to FIG. 3, a spray nozzle assembly 58 is disposed in the upper portion of the reactor 36 midway between the side walls 36d and 36c and extending the width of the reactor for introducing a spray of water into reactor 36. The assembly 58 extends through the wall 36b and is suitably attached to, and supported by, the walls 36a and 36b. The louvers 48a and 48b are inclined downwardly at an angle of approximately 15 to 20 degrees and the openings 50a and 50b are disposed in the lower portion of the walls 36c and 36d, respectively, to direct the flow of the water stream away from the walls 36c and 36d, for purposes that will be discussed later.

Figure 5:
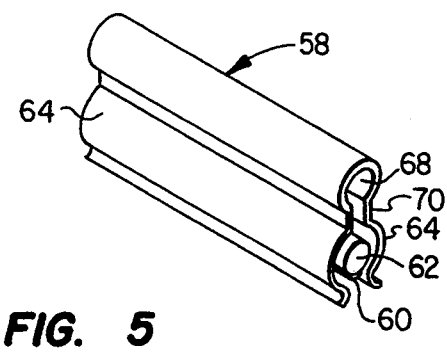
FIG. 5 is a perspective view of the spray nozzle.

As shown in FIG. 5, the spray nozzle assembly 58 includes a spray nozzle 60 and a water header 62 for supplying water to the spray nozzle. The water header 62 and spray nozzle 60 are disposed within an air jacket 64 which shrouds the water spray from the spray nozzle 60 with air. A compressed air header 68 is connected to the air jacket 64 by an air duct 70 for supplying air to the air jacket 64. As shown in FIG. 2, a water inlet 72 and an air inlet 74 extend through the wall 36b and register with the water header 62 and the air header 68, respectively, to supply water and air to the nozzle assembly 58.

In operation of the steam generator 10, a bed 18 of particulate material consisting of sulfur-containing fuel and sorbent material, such as coal and limestone, is formed on the plate 16. Air is introduced into the plenum chamber 14 at a sufficient velocity to fluidize the particulate material and a quantity of start-up coal is introduced through the distributor 20 (FIG. 1) and is spread over the upper surface of the bed 18. The particulate material, including the start-up coal, is ignited by burners (not shown) positioned within the bed and, as the combustion of the coal progresses additional air is introduced into the plenum chamber 14 at a relatively high pressure and velocity. Alternately, the bed 18 can be warmed up by a burner located in the plenum 14.

The high-pressure, high-velocity, combustion-supporting air introduced by the air distribution plate 11 from the plenum chamber 14 causes a portion of the relative-fine particulate material, including particles of coal ash and limestone, to become entrained within, and to thus be pneumatically transported by, the air and the combustion gases (hereinafter referred to as "flue gases") which contain sulfur oxides resulting from the combination of the sulfur-containing fuel. This mixture of entrained particles and flue gases rise upwardly within the reactor 12 to form a gas column and passes from the reactor 12 through the opening 12a and into the cyclone separator 24.

The coarse particles accumulate in the lower portion of the reactor 12 along with a portion of the fine particles. A portion of the fine particles traveling the length of the gas column exit from the reactor 12 through the opening 12a and are separated from the flue gases within the separator 24 before being recycled back to the fluidized bed 18 through the recycle conduit 26, while the remaining portion of the fine particles remain entrained in the flue gases. The recycled portion of fine particles, plus the introduction of additional particulate fuel material through the distributor 20 maintains the saturated gas column above the bed 18, The mixture of hot flue gases and fine particles from the separator 24 pass through the heat recovery enclosure 28 to remove heat from the mixture and add heat to water flowing through conventional water flow circuitry (not shown) in the enclosure before the mixture enters the air preheater 34. Additional heat is recovered from the mixture and added to oxidizing gases flowing through conventional heat exchangers (not shown) contained within the air preheater 34. The mixture enters the humidifying reactor 36 at five locations via the branches 38a, 38b, 38c, 38d and 38e of the duct 38 and via the plenum chambers 44a, 44b, 46a and 46b.

A portion of the entrained fine particles are particles of limestone which are both unsulfated and have undergone chemical conversion to calcined limestone as a result of the high temperature in the reactor 12. The mixture of flue gases and entrained fine particles enter the humidifying reactor 36 at a reduced temperature as a result of the heat extracted from the mixture by the heat recovery enclosure 28 and by the air preheater 34. The spray nozzle 60 disperses water into a plurality of fine water particles that evaporate and humidify the flue gases, which in combination with the reduced temperature of the mixture, is highly conducive to the formation of a thin film of alkali solution of calcium hydroxide on the surface of the limestone. Sulfur oxides in the gases/particles mixture resulting from the combustion of sulfur containing fuels are subsequently absorbed into the alkali solution to form calcium sulfate and calcium sulfite precipitation.

The louvers 48a and 48b (FIG. 3) on the side walls 36c and 36d, respectively, break the mixture of gases/particles into a plurality of small streams and direct the precipitation away from the side walls to prevent potential scaling problems caused by the precipitation of calcium sulfate and calcium sulfite. Also, compressed air is introduced around the spray nozzle 60 by the air jacket 64 to prevent the entrained ash in the flue gases from depositing on the spray nozzle 60 which would result in blockage. The rotary valve 54 removes the precipitation, as well as fly ash, from the reactor 36 for disposal and the relatively clean flue gases are passed, via the duct 40, to the baghouse 42 for further treatment.

The baghouse 42 operates in a conventional manner to further remove any remaining entrained particles of limestone. The filtered limestone is recycled to the lower and/or upper portion of the duct 38 by the ducts 43a and/or 43b, respectively, for subsequent humidification and precipitation in the reactor 36.

It is thus seen that the reactor of the present invention utilize the unsulfated calcined limestone comprising a significant percentage of the entrained fine particles for the absorption of sulfur oxides resulting from the combustion of fuels containing sulfur. The use of the limestone particles contained in the flue gases results in significant cost savings in that it avoids the recurring costs associated with the procurement of SOx scrubbing compounds, such as lime, in addition to the non-recurring cost associated with equipment required for the injection of SOx scrubbing compounds.

Although not specifically illustrated in the drawings, it is understood that other additional necessary equipment and structural components will be provided, and that these and all of the components described above are arranged and supported in any appropriate fashion to form a complete and operative system.

It is also understood that variations may be made in the reactor of the present invention without departing from the scope of the invention. For example, for certain applications, the water injected into the humidifying reactor 36 can be replaced by a solution of lime. Similarly, the water nozzle assembly could be supplemented with a lime or limestone injector(s).

Of course, other variations in the foregoing can be made by those skilled in the art, and in certain instances some features of the invention will be employed without a corresponding use of other features. Accordingly, it is appropriate that the appended claims be construed broadly and in a manner consistent with the scope of the invention.

What is claimed is:

1. A reactor for treating a gaseous product, said reactor comprising;

a vessel having two opposed walls;

two plenums respectively associated with said opposed walls for receiving said gaseous product;

a plurality of louvers extending through each of said opposed walls and respectively aligned with said plenums for introducing said gaseous product into the interior of said vessel;

means for introducing water into an area of said vessel between said opposed walls and their respective louvers to humidify said gaseous product;

two additional plenums respectively associated with said opposed walls for receiving additional gaseous product, said additional plenums being located at a different level of said vessel than said first-mentioned plenums; and a plurality of inlet openings extending through each of said opposed walls and respectively aligned with said additional plenums for introducing said additional gaseous product into the interior of said vessel at a different level than the level of introduction of said first-mentioned gaseous product; and an additional plenum associated with the roof of said vessel for receiving additional gaseous product and an inlet opening formed through said roof for introducing said latter additional gaseous product from said roof downwardly into said vessel.

2. The reactor of claim 1 wherein said latter additional gaseous product is discharged over said water-introducing means.

3. The reactor of claim 1 wherein said louvers function to break said gaseous product into a plurality of streams to promote said humidification and to direct said gaseous product into said vessel and away from their respective opposed walls.

* * * * *